United States Patent [19]
Ide et al.

[11] Patent Number: 4,843,384
[45] Date of Patent: Jun. 27, 1989

[54] WIRELESS REMOTE CONTROL SYSTEM

[75] Inventors: Yuichi Ide; Harunobu Nukushina, both of Fuji; Naoki Ichien, Shizuoka, all of Japan

[73] Assignee: Kabushiki Kaisha Toshiba, Kawasaki, Japan

[21] Appl. No.: 195,903

[22] Filed: May 19, 1988

[30] Foreign Application Priority Data

May 29, 1987 [JP] Japan ................................ 62-133666

[51] Int. Cl.⁴ ............................................. H04Q 1/00
[52] U.S. Cl. ......................... 340/825.69; 340/825.06; 340/825.72; 358/194.1; 455/603
[58] Field of Search ....................... 318/16; 307/141.4; 315/360; 340/825.06, 825.07, 825.69, 825.72, 309.15, 309.4; 358/194.1; 455/603

[56] References Cited

U.S. PATENT DOCUMENTS 3,940,701  2/1976  Novitski ............................ 455/603 X
4,418,333 11/1983  Schwarzbach et al. ... 340/825.07 X
4,729,293  3/1988  Tsunoda et al. .................... 98/40.24

Primary Examiner—Ulysses Weldon
Attorney, Agent, or Firm—Foley & Lardner, Schwartz, Jeffery, Schwaab, Mack, Blumenthal & Evans

[57] ABSTRACT

A wireless remote control system has a hold-type wireless remote controller and a fixedly mounted main controller. When the wireless remote controller sets an operation time of a controlled object, it sends to the main controller a first code representative of a setting time corresponding to a difference between the operation time and a current time. Upon reception of the first code, the main controller sets the setting time at its timer. When a current time becomes the operation time, the wireless remote controller transmits a second code for operating the controlled object. If the main controller can receive the second code, the controlled object can be operated in response to the received second code. If on the other hand the main controller cannot receive the second code, the controlled object is operated by a time-up signal of the time in the main controller.

4 Claims, 6 Drawing Sheets

WIRELESS REMOTE CONTROL SYSTEM

BACKGROUND OF THE INVENTION

1. Field of the Art

The present invention relates to a wireless remote control system having a timer function suitable for remotely controlling, for example, an air conditioner.

2. Prior Art

In a conventional wireless remote control system of this type, there is known a method wherein a hold-type wireless remote controller has its own clock and timer to set a desired operation time (operation start time or operation end time) of an object to be controlled. When it becomes an operation time, the remote controller transmits a code indicative of operation stop or end to the controlled object side. The code is received by a main controller fixedly mounted on the controlled object side to start or stop its running.

With this method, signals to be transmitted from the remote controller to the main controller are only a limited number of codes so that the power consumption of a battery at the remote controller is small and also the operation time can be set finely. However, in a wireless remote control system employing infrared radiation in transmitting codes, it becomes necessary to always align a transmission section of the wireless remote controller to the range within which the main controller can receive transmitted infrared codes. In case the direction of the transmitted infrared radiation is greatly displaced from such a range, the main controller cannot receive it even if the timer in the wireless remote controller operates normally so that the controlled object cannot be manipulated, resulting in a degradation of system reliability.

SUMMARY OF THE INVENTION

It is a first object of the present invention to provide a wireless remote control system having a high degree of freedom, capable of controlling the operation of the controlled object at a predetermined operation time without fail even if codes are transmitted using infrared radiation.

It is a second object of the present invention to provide a wireless remote control system capable of controlling the operation of the controlled object without fail when a small number of codes are transmitted from the remote controller to the main controller.

To achieve the above objects, a wireless remote control system of this invention comprises a hold-type wireless remote controller and a fixedly mounted main controller, the wireless remote controller comprising: clock means for providing a current time; setting means for setting an operation time of a controlled object; calculation means for calculating a difference between an operation time set by the setting means and a current time provided by the clock means and outputting the difference as a setting time; code generating means for generating a first code representative of the setting time calculated by the calculation means and a second code for operating the controlled object; and transmission means for transmitting the first code when the setting means sets the operation time, and the second code when the current time becomes the operation time; and the main controller comprising: reception means for receiving the codes from the transmission means; timer means which is set by the first code received by the reception means; and operation means for operating the controlled object if a logical OR condition is satisfied between a first signal indicating that the reception means has received the second code and a second signal indicating that the timer means has timed up.

According to the present invention, when the wireless remote controller sets an operation time of a controlled object, it sends to the main controller a first code representative of a setting time corresponding to a difference between the operation time and a current time. Upon reception of the first code, the main controller sets the setting time at its timer. When a current time becomes the operation time, the wireless remote controller transmits a second code for operating the controlled object. If the main controller can receive the second code, the controlled object can be operated in response to the received second code. If on the other hand the main controller cannot receive the second code, the controlled object is operated by a timeup signal of the timer in the main controller.

DETAILED DESCRIPTION OF A PREFERRED EMBODIMENT

Figure 1:
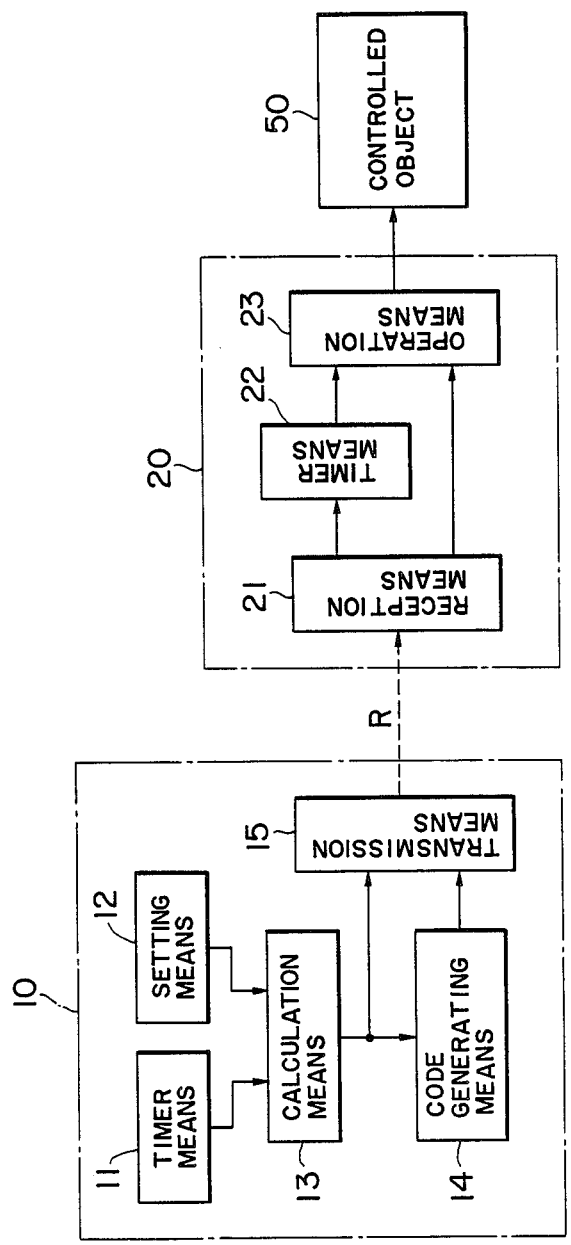
FIG. 1 is a functional block diagram showing an embodiment of a wireless remote control system according to the present invention.

FIG. 1 is a functional block diagram of an embodiment of a wireless control system according to the present invention. A serial infrared signal R representative of first and second codes to be described later is transmitted from a hold-type wireless remote controller 10 to a fixedly mounted main controller 20.

In the wireless remote controller 10, clock means 11 generates time information representative of a current time $t_p$. When setting means 12 sets a desired operation time $t_d$ for operating a controlled object 50, calculation means 13 calculates a difference ($t_p - t_d$) between both the times to use it as a setting time $T_s$, and also calculates a coarse time $T_u$ of the setting time in units of 30 minutes where the fraction not larger than 30 minutes of the setting time is raised to a unit of 30 minutes. Code generating means 14 generates a first code representative of the calculated setting time $T_s$ and a second code representative of the operation content of the controlled object 50. Transmission means 15 transmits the first code when setting means 12 sets the operation time and the second code for operating the controlled object 50 when the current time $t_p$ provided by clock means 11 becomes the operation time $t_d$ set by setting means 12.

In the main controller 20, when reception means 21 receives the first code, it sets a setting time corresponding to the first code at timer means 22. Operation means 23 starts controlling the controlled object 50 when a logical OR condition is met between a time-up signal from timer means 22 and the second code received by reception means 21.

Figure 2:
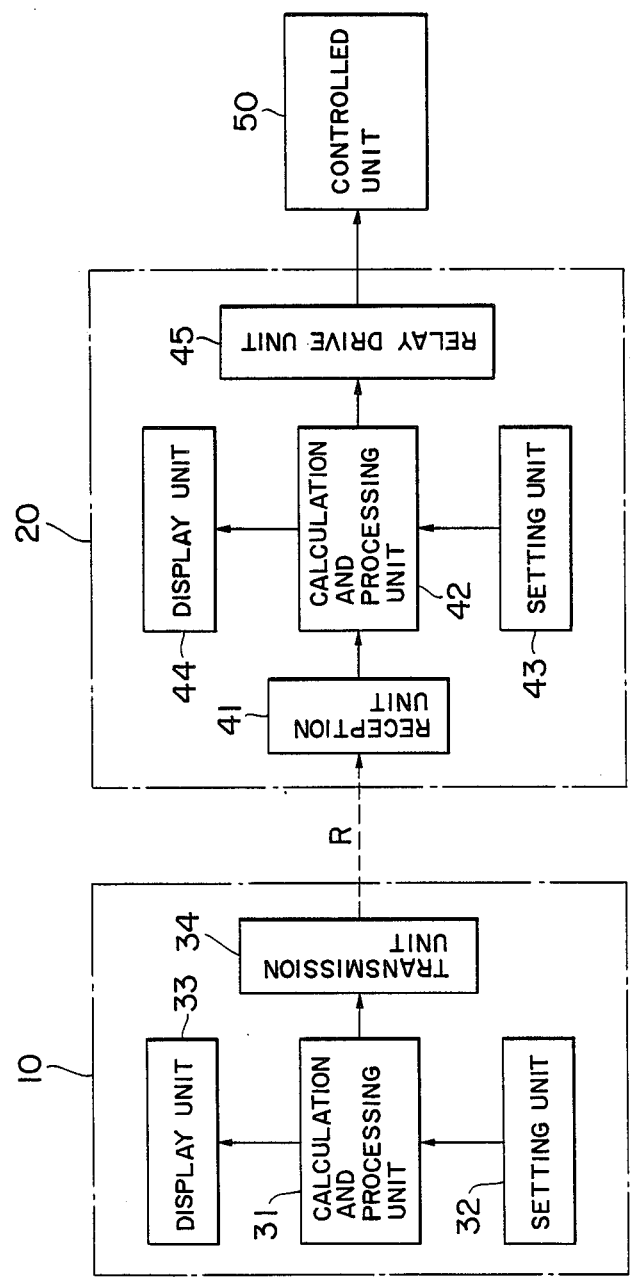
FIG. 2 is a block diagram of hardwares of the system shown in FIG. 1.

FIG. 2 is a block diagram of hardwares of the wireless control system of this embodiment which is particularly suitable for use with an air conditioner.

The wireless remote controller 10 comprises: a calculation and processing unit 31 made of a microprocessor with a built-in timer function; a setting unit 32 for setting a time and the like with a key, touch-switch or the like; a display unit 33 for displaying the content set by the setting unit 32 or the content processed by the calculation and processing unit 31; and a transmission unit 34 for transmitting a code representative of the content processed by the calculation and processing unit 31 in the form of an infrared signal R.

The main controller 20 comprises: a reception unit 41 for receiving the infrared signal R transmitted from the transmission unit 34; a calculation and processing unit 42 made of a microprocessor with a built-in timer function; a setting unit 43 with a key, a touch-key or the like; a display unit 44 for displaying the content set by the setting unit 43 or the content processed by the calculation and processing unit 42; and a relay drive unit 45 responsive to an output from the calculation and processing unit 42 for starting or stopping the operation of the controlled object 50 (e.g., an air conditioner).

Figure 3:
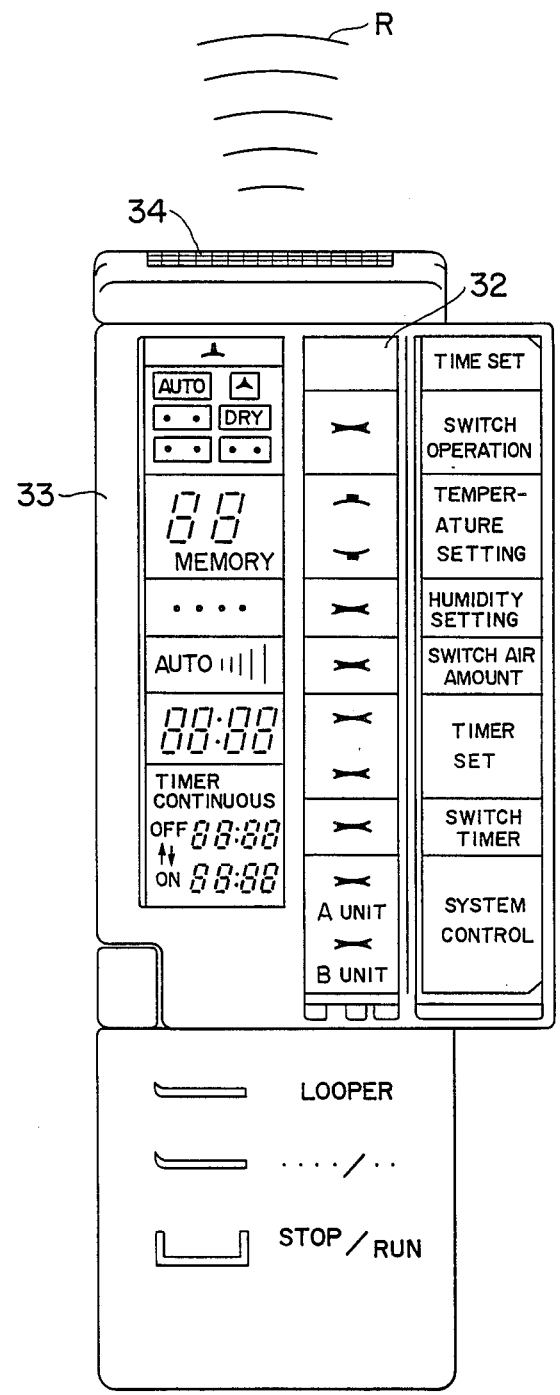
FIG. 3 is a plan view of the wireless remote controller.

FIG. 3 is a plan view of the wireless remote controller 10 whose outside structure has an elongated shape convenient for gripping it, with the setting unit 32 and the display unit 33 arranged side by side and the transmission unit 34 disposed at the front end thereof for radiating an infrared signal R.

Figure 4:
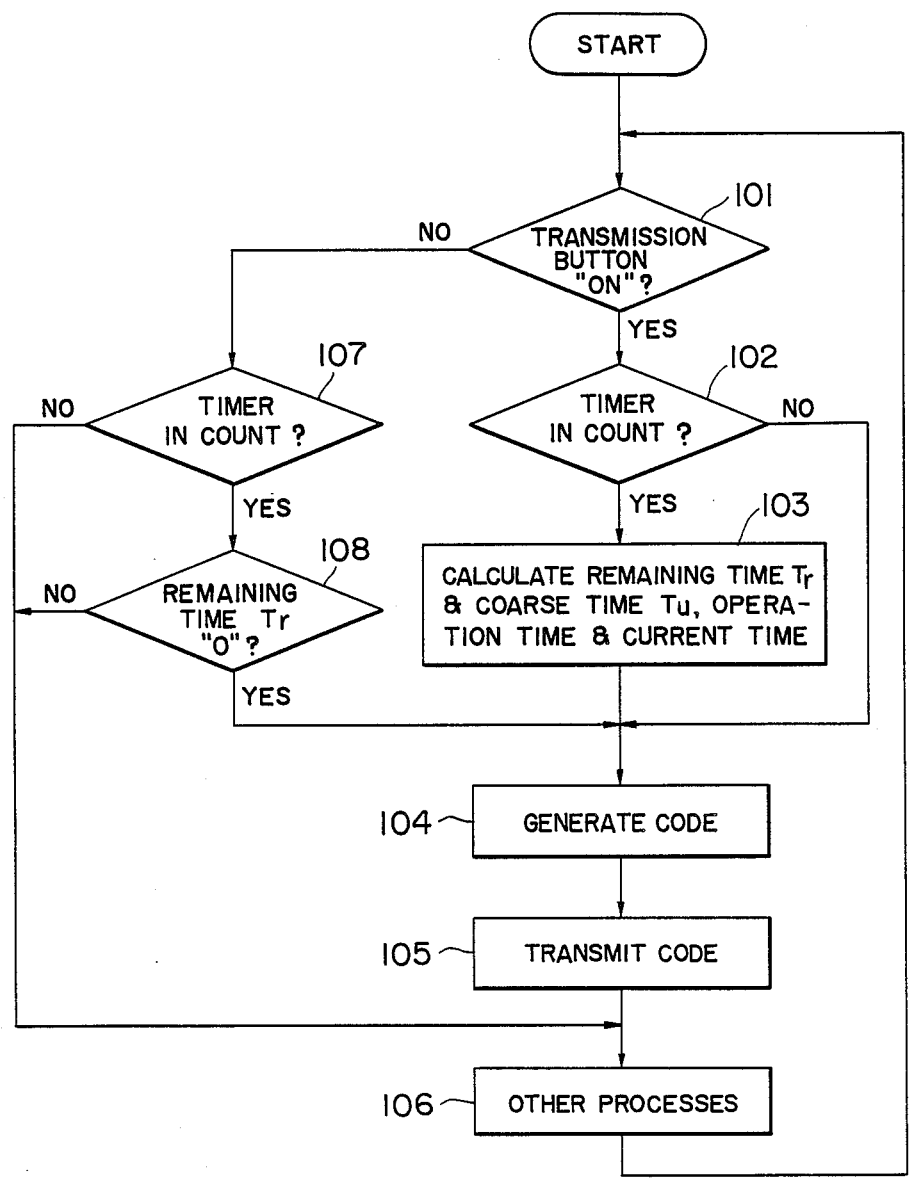
FIGS. 4 and 5 are flow charts used for explaining the operation of the system.
Figure 5:
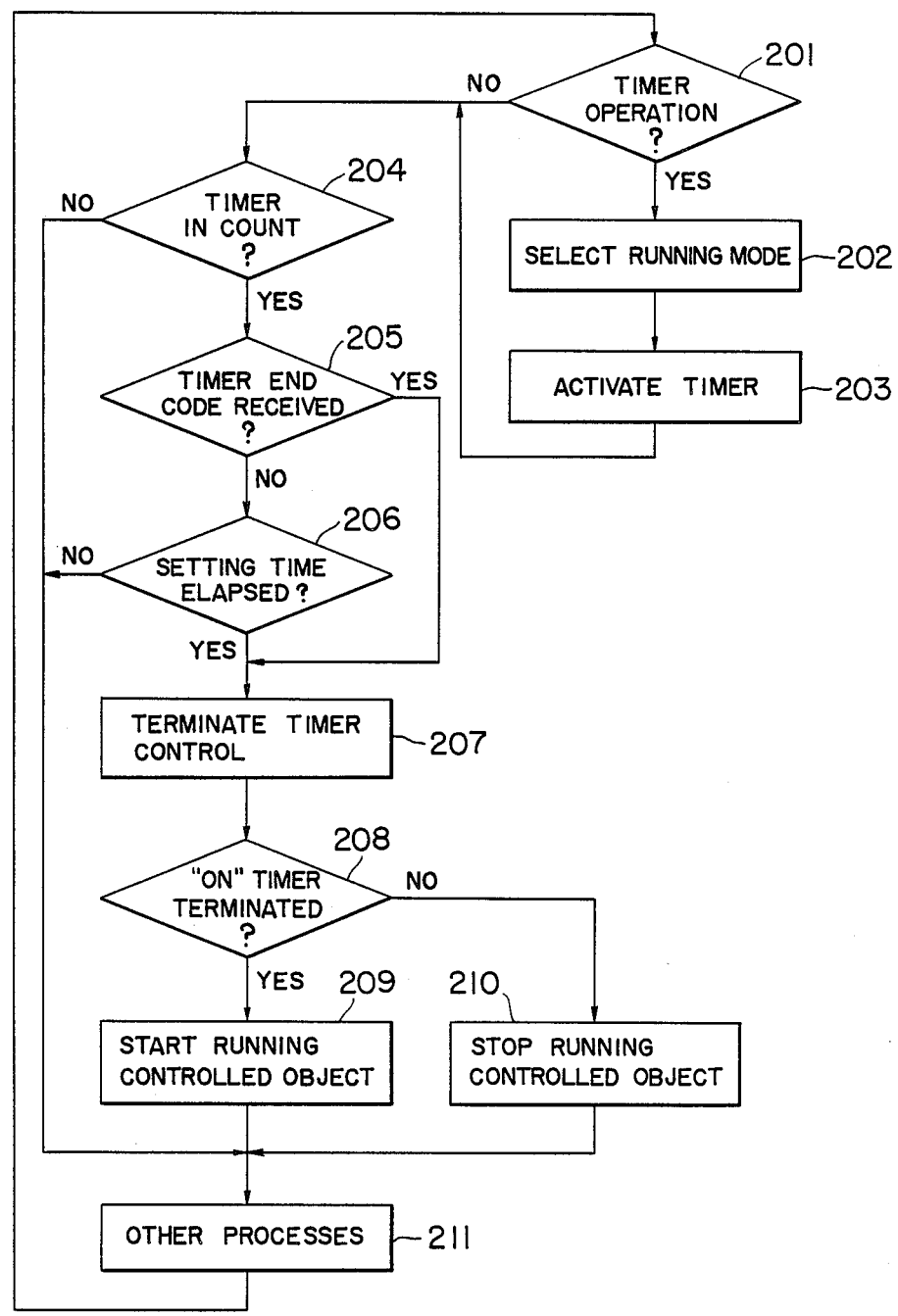

The operation of the wireless remote control system of this invention constructed as above will be described with reference to the flow charts shown in FIGS. 4 and 5.

A current time, an "OFF" timer setting time, an "ON" timer setting time and the like are displayed on the display unit 33 of the wireless remote controller 10 in units of minutes. The wireless remote controller 10 generates a timer setting code in units of 30 minutes and a timer time-up code as a signal for operating the controlled object 50 at a designated time. It is now assumed that an air conditioner starts running at a current time of 12:00 and stops running at an operation time 14:20. In this case, when a timer is set at 14:20 with the setting unit 32 and a transmission button is actuated, the calculation and processing unit 31 checks if the transmission button is turned ON at step 101 of FIG. 4, checks if the timer is now in count operation at step 102, and calculates at step 103 a remaining time-$T_r$, i.e., a difference 2 hours and 30 minutes between the operation time 14:20 and the current time 12:00, and calculates a coarse time $T_u$ of 2 hours and 30 minutes in units of 30 minutes with fractions raised. At step 104, a code representative of an "OFF" running mode and the coarse time $T_u$ (2 hours and 30 minutes) is generated. At step 105, a string of codes is transmitted from the transmission unit 34 to the main controller 20 in the form of a serial signal R. If the transmission button is not activated again, the calculation and processing unit 31 checks at step 107 if the timer is still in a count operation and thereafter, checks at step 108 if a current time is the operation time 14:20, i.e., if the remaining time $T_r$ is 0 or not. If 0, a code representative of the end of the "OFF" running mode is generated at step 104 to transmit it to the main controller 20 at step 105.

Next, when the reception unit 41 of the main controller 20 receives an infrared signal R from the wireless remote controller 10, the calculation and processing unit 42 checks if the signal R is representative of the timer operation. If the timer operation, the "OFF" running mode is designated at step 202. Thereafter, at step 203 a timer in the main controller is set and the relay drive unit 43 is activated to start running the controlled object 50. At step 204, it is checked if the timer in the main controller is in a count operation. At step 205, it is checked if a code representative of the count end of the timer of the wireless remote controller 10 has been received. At step 206, it is checked if the actual time set at the timer of the main controller 20 has elapsed. In both cases including a reception of the time-up and the elapse of the actual setting time, the timer control is terminated at step 207.

As above, if the timer count end code is received from the wireless remote controller 10 correctly at the setting time 14:20 of the "OFF" running mode, the controlled object 50 stops running. Alternatively, if the transmission direction of the wireless remote controller 10 is displaced and the main controller 20 cannot receive the infrared signal R, the built-in timer means 22 causes the controlled object 50 to stop running at its time-up at 14:30 (corresponding to the coarse time $T_u$).

Figure 6:
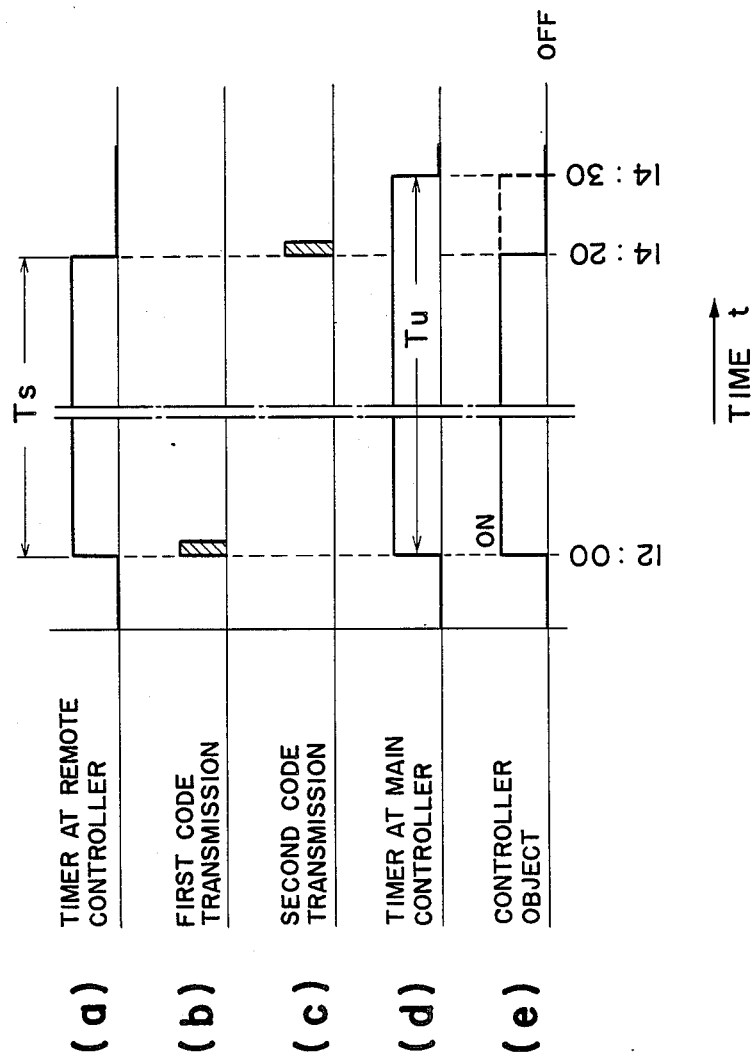
FIG. 6 is a timing chart illustrating the operation of the system.

FIG. 6 is a timing chart illustrating the above operation. When the "OFF" running mode and the running end time, i.e., the operation time of 14:20 are set at the wireless remote controller 10 at 12:00, a first code representative of the "OFF" running mode and the coarse time $T_u$ of 2 hours and 30 minutes calculated from the setting time 14:20 is transmitted to the main controller 20. Then the main controller causes the controlled object 50 to start running and initiates the counting of 2 hours and 30 minutes from 12:00. When it becomes 14:20, a second code representative of the count end is transmitted from the remote controller 10 to the main controller 20. In this case, on condition that the remote controller 10 is correctly directed toward the main controller 20, the main controller 20 can receive the second code from the remote controller 10 so that the controlled object 50 can be stopped (indicated by solid lines in FIGS. 6(a), 6(c) and 6(e)). If the main controller 20 cannot receive the second code, the controlled object 50 continues its running after 14:20. However, when it becomes a time 14:30 corresponding to the coarse time $T_u$, the timer means 22 in the main controller 20 counts up so that the controlled object 50 can be stopped in response to the count-up signal serving as a back-up signal for the system (indicated by broken lines in FIGS. 6(d) and 6(e)).

As appreciated from the foregoing description of this invention, the controlled object is operated if a logical OR condition is met between a time-up signal from the remote controller 10 and a time-up signal from the main controller 20. Therefore, the number of codes required for the main controller to be transmitted from the remote controller can be reduced, to thereby attain a reliable control over the controlled object.

In the above embodiment, the calculation means 13 calculates the coarse time in units of 30 minutes through raising, and the code generating means 14 generates a code corresponding to the coarse time. Thus, a back-up signal always delays from the operating time as set, while leaving no problem of the control in practical use.

In the above embodiment, an "OFF" running mode has been described by way of example. However, the present invention is not limited thereto but an "ON" running mode instead is also applicable wherein the controlled object stops its running at a designated time and starts it running after a lapse of a predetermined time, or a combination of "ON" to "OFF" or "OFF" to "ON" running mode is also applicable.

Further, the present invention can be applied to various controlled objects other than air conditioners.

What is claimed is:

1. A wireless remote control system having a hold-type wireless remote controller and a fixedly mounted main controller, said wireless remote controller comprising:
clock means for providing a current time;
setting means for setting an operation time of a controlled object;
calculation means for calculating a difference between an operation time set by said setting means and a current time provided by said clock means and outputting the difference as a setting time;
code generating means for generating a first code representative of the setting time calculated by said calculation means and a second code for operating the controlled object; and
transmission means for transmitting the first code when said setting means sets the operation time, and the second code when the current time becomes the operation time; and said main controller comprising:
reception means for receiving the codes from said transmission means;
timer means which is set by the first code received by said reception means; and
operation means for operating the controlled object if a logical OR condition is satisfied between a first signal indicating that said reception means has received the second code and a second signal indicating that said timer means has timed up.

2. A wireless remote control system according to claim 1, wherein said calculation means calculates a coarse time of the remaining time by raising the fraction thereof, and generates a code corresponding to the coarse time as the second code.

3. A wireless remote control system according to claim 2, wherein said calculation means calculates the coarse time by raising the fraction thereof in units of 30 minutes.

4. A wireless remote control system according to claim 1, wherein said transmission means of the wireless remote controller has a device for radiating an infrared ray, and said reception means of the main controller has a device for sensing the infrared ray.

* * * * *